(12) United States Patent
Dan et al.

(10) Patent No.: US 8,916,308 B2
(45) Date of Patent: Dec. 23, 2014

(54) FUEL CELL

(75) Inventors: Koji Dan, Wako (JP); Yukihiko Kiyohiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/989,685

(22) PCT Filed: Apr. 14, 2009

(86) PCT No.: PCT/JP2009/057814
§ 371 (c)(1), (2), (4) Date: Oct. 26, 2010

(87) PCT Pub. No.: WO2009/133779
PCT Pub. Date: Nov. 5, 2009

(65) Prior Publication Data
US 2011/0045376 A1   Feb. 24, 2011

(30) Foreign Application Priority Data
Apr. 28, 2008   (JP) ................. 2008-117363

(51) Int. Cl.
*H01M 8/24* (2006.01)
*H01M 8/04* (2006.01)
*H01M 8/02* (2006.01)
*H01M 8/12* (2006.01)

(52) U.S. Cl.
CPC .......... *H01M 8/0258* (2013.01); *H01M 8/0247* (2013.01); *H01M 8/2425* (2013.01); *H01M 8/249* (2013.01); *H01M 2008/1293* (2013.01); *H01M 2250/20* (2013.01); *Y02E 60/50* (2013.01); *Y02E 60/525* (2013.01); *Y02T 90/32* (2013.01)
USPC .......................................... 429/456; 429/452

(58) Field of Classification Search
CPC .......................... H01M 8/0247; H01M 8/0258
USPC .................................................. 429/456, 452
See application file for complete search history.

(56) References Cited

U.S. PATENT DOCUMENTS

| | | | | |
|---|---|---|---|---|
| 3,208,740 | A | * | 9/1965 | Nesbitt et al. ................. 432/147 |
| 2003/0039876 | A1 | * | 2/2003 | Knights et al. ................. 429/30 |
| 2005/0142422 | A1 | * | 6/2005 | Homma et al. ................ 429/38 |
| 2011/0039182 | A1 | * | 2/2011 | Dan et al. ..................... 429/456 |

FOREIGN PATENT DOCUMENTS

| | | |
|---|---|---|
| JP | 10-172594 | 6/1998 |
| JP | 2005-85520 | 3/2005 |
| JP | 2006-120589 | 5/2006 |
| JP | 2006-222099 | 8/2006 |
| JP | 2006-285221 | 10/2006 |
| JP | 2007-261121 | 10/2007 |
| WO | WO 2008020533 A1 * | 2/2008 |

* cited by examiner

*Primary Examiner* — Milton I Cano
*Assistant Examiner* — Brent Thomas
(74) *Attorney, Agent, or Firm* — Nelson Mullins Riley & Scarborough LLP; Anthony A. Laurentano

(57) ABSTRACT

A fuel cell includes separators sandwiching electrolyte electrode assemblies. The separators each include first and second fuel gas supply sections through which a fuel gas supply passage extends centrally, first and second bridges extending radially outwardly from the first and second fuel gas supply sections, and first and second sandwiching sections connected to the first and second bridges. A fuel gas channel and an oxygen-containing gas channel are provided in the first and second sandwiching sections. Each of the first sandwiching sections has pairs of fuel gas outlets and a fuel gas consumed in the fuel gas channel is discharged through the fuel gas outlets.

20 Claims, 18 Drawing Sheets

→ OXYGEN-CONTAINING GAS
--→ FUEL GAS (Prior Art)

→ OXYGEN-CONTAINING GAS
--→ FUEL GAS

FUEL CELL

RELATED APPLICATIONS

This application is a 35 U.S.C. 371 national stage filing of International Application No. PCT/JP2009/057814, filed Apr. 14, 2009, which claims priority to Japanese Patent Application No. 2008-117363 filed on Apr. 28, 2008 in Japan. The contents of the aforementioned applications are hereby incorporated by reference.

TECHNICAL FIELD

The present invention relates to a fuel cell formed by sandwiching electrolyte electrode assemblies between separators. Each of the electrolyte electrode assemblies includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, predetermined numbers of the electrolyte electrode assemblies and the separators are stacked together to form a fuel cell stack.

For example, in a flat plate type solid oxide fuel cell disclosed in Japanese Laid-Open Patent Publication No. 10-172594, a separator $1a$ as shown in FIG. 16 is provided, and a plurality of unit cells (not shown) and separators $1a$ are stacked alternately. Gas supply holes $2aa$, $3aa$, and gas discharge holes tab, $3ab$ extend through four corners of the separator $1a$ in the stacking direction, and a plurality of gas flow grooves $4aa$ and ridges $4ab$ in a plurality of rows are arranged alternately along the surface of the separator $1a$.

The gas flow grooves $4aa$ are connected to the gas supply hole $2aa$ and the gas discharge hole tab through triangular recesses $5aa$, $5ab$. A throttle section $6a$ and blocks $7a$ are provided in a gas inlet section of the triangular recess $5aa$, near the gas supply hole $2aa$, as means for limiting the flow rate of the gas. The throttle section $6a$ and the blocks $7a$ function to increase the pressure loss of the gas flowing from the gas supply hole $2aa$ to the gas inlet section for equal distribution of the gas.

Further, at opposite ends of the gas flow grooves $4aa$, a shallow gas flow inlet section $8aa$ and a shallow gas flow outlet section $8ab$ are provided to cause a pressure loss in the gas flow.

Further, in a solid oxide fuel cell disclosed in Japanese Laid-Open Patent Publication No. 2005-085520, as shown in FIG. 17, the fuel cell is formed by stacking a power generation cell $1b$, a fuel electrode current collector $2b$, an air electrode current collector $3b$, and separators $4b$. The power generation cell $1b$ includes a fuel electrode layer, and an air electrode layer, and a solid electrolyte layer interposed between the fuel electrode layer and the air electrode layer. The fuel electrode current collector $2b$ is provided outside the fuel electrode layer, and the air electrode current collector $3b$ is provided outside the air electrode layer. The separators $4b$ are provided outside the current collectors $2b$, $3b$. Though not shown, a ring shaped metal cover covers the outer circumferential portion of a circular porous metal body making up the current collector $2b$, and a large number of gas outlets are provided over the entire circumferential side portion of the cover at predetermined intervals.

In the structure, the fuel gas diffused in the porous metal body is prevented from being emitted from the entire outer circumferential portion of the porous metal body. According to the disclosure, the amount of the fuel gas which is not used in the power generation and discharged from the outer circumferential portion is suppressed, and the fuel gas is thus supplied to the power generation cell $1b$ efficiently.

Further, in a flat stack fuel cell disclosed in Japanese Laid-Open Patent Publication No. 2006-120589, as shown in FIG. 18, a separator $1c$ stacked on a power generation cell is provided. The separator $1c$ is formed by connecting left and right manifold parts $2c$ and a part $3c$ disposed at the center where the power generation cell is provided, by joint parts $4c$. The joint parts $4c$ have elasticity.

The manifold parts $2c$ have gas holes $5c$, $6c$. One gas hole $5c$ is connected to a fuel gas channel $7c$, and the other gas hole $6c$ is connected to an oxygen-containing gas channel $8c$. The fuel gas channel $7c$ and the oxygen-containing gas channel $8c$ extend in a spiral pattern into the part $3c$, and are opened to a fuel electrode current collector and an air electrode current collector (not shown), respectively, at positions near the center of the part $3c$.

SUMMARY OF INVENTION

In Japanese Laid-Open Patent Publication No. 10-172594, since seals are provided, in comparison with a seal-less structure, excessive loads tend to be applied to the MEAs. Therefore, for example, the MEAs may be cracked or damaged undesirably. Further, Japanese Laid-Open Patent Publication No. 10-172594 is not directed to a technique of suitably preventing the fuel gas, the oxygen-containing gas, or the exhaust gas from unnecessarily flowing around.

Further, in Japanese Laid-Open Patent Publication No. 2005-085520, the ring-shaped metal cover has a large number of gas outlets formed at predetermined intervals over the entire circumferential side portion of the metal cover, and the metal cover and the separator are provided as separate components. Therefore, a larger number of components are required, the structure is complicated, and the cost is high. Further, a larger number of assembling steps are required, and thus, the operating efficiency is low. Further, the dimension in the thickness direction is large, and the length of the entire stack in the stacking direction is large.

Further, in Japanese Laid-Open Patent Publication No. 2006-120589, the fuel gas, the oxygen-containing gas, or the exhaust gas tends to flow around to portions to which such a gas does not need to be supplied. As a result, the electrodes may be degraded undesirably, and power generation performance may be lowered undesirably. Further, since one power generation cell is provided in each separator $1c$ and the manifolds are provided around the MEA, the heat generated in the power generation tends to be radiated easily, and the thermal efficiency is lowered. It is not possible to facilitate thermally self-sustained operation.

The present invention solves the above problems, and an object of the present invention is to provide a fuel cell having a simple and economical structure, in which it is possible to prevent gases from unnecessarily flowing around to portions, secure a uniform temperature distribution, achieve improvement in the thermal efficiency, and facilitate a thermally self-sustained operation, and it is, possible to achieve improvement in the durability.

The present invention relates to a fuel cell formed by stacking electrolyte electrode assemblies and separators alternately in a stacking direction. Each of the electrolyte electrode assemblies includes an anode, a cathode, and an electrolyte interposed between the anode and the cathode.

Each of the separators includes a sandwiching section for sandwiching the electrolyte electrode assembly, a bridge connected to the sandwiching section, and a fuel gas supply section connected to the bridge. A fuel gas channel for supplying a fuel gas along an electrode surface of the anode of one electrolyte electrode assembly and an oxygen-containing gas channel for supplying an oxygen-containing gas along an electrode surface of the cathode of the other electrolyte electrode assembly are individually formed in the sandwiching section. A fuel gas supply channel for supplying the fuel gas to the fuel gas channel is formed, in the bridge. A fuel gas supply passage for supplying the fuel gas to the fuel gas supply channel extends through the fuel gas supply section in the stacking direction.

The sandwiching section includes a fuel gas inlet for supplying the fuel gas to the fuel gas channel, an outer circumferential protrusion protruding on the side of the fuel gas channel, and contacting an outer circumference of the anode, and a plurality of fuel gas outlets provided on the side of a portion connecting the sandwiching section and the bridge, on each of both sides of the bridge for discharging the fuel gas consumed in the fuel gas channel (hereinafter referred to as the exhaust fuel gas).

In the present invention, the fuel gas supplied from the fuel gas inlet to the fuel gas channel is prevented from flowing to the outside without reaction, by the outer circumferential protrusion protruding on the side of the fuel gas channel to contact the outer circumference of the anode. In the structure, the fuel gas can be utilized effectively in power generation, and improvement in its fuel utilization ratio is achieved suitably.

Further, it is possible to prevent the other gases such as the oxygen-containing gas and the exhaust gas from flowing around to the anode from the outside of the electrolyte electrode assembly. Thus, degradation of the power generation efficiency due to oxidation of the anode is prevented, and improvement in the durability of the separator and the electrolyte electrode assembly is achieved.

Further, after the fuel gas supplied from the fuel gas inlet to the fuel gas channel is consumed in the reaction, the consumed fuel gas is distributed to and discharged through fuel gas outlets provided on the side of the portion connecting the sandwiching section and the bridge, on each of both sides of the bridges. In the structure, it becomes possible to achieve a uniform temperature distribution in the fuel cell, and the durability of the fuel cell is improved advantageously. Moreover, the fuel gas flowing through the fuel gas supply channel in the bridge and the fuel gas supply passage in the fuel gas supply section can be heated beforehand by the exhaust fuel gas. Therefore, it is possible to facilitate thermally self-sustained operation.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
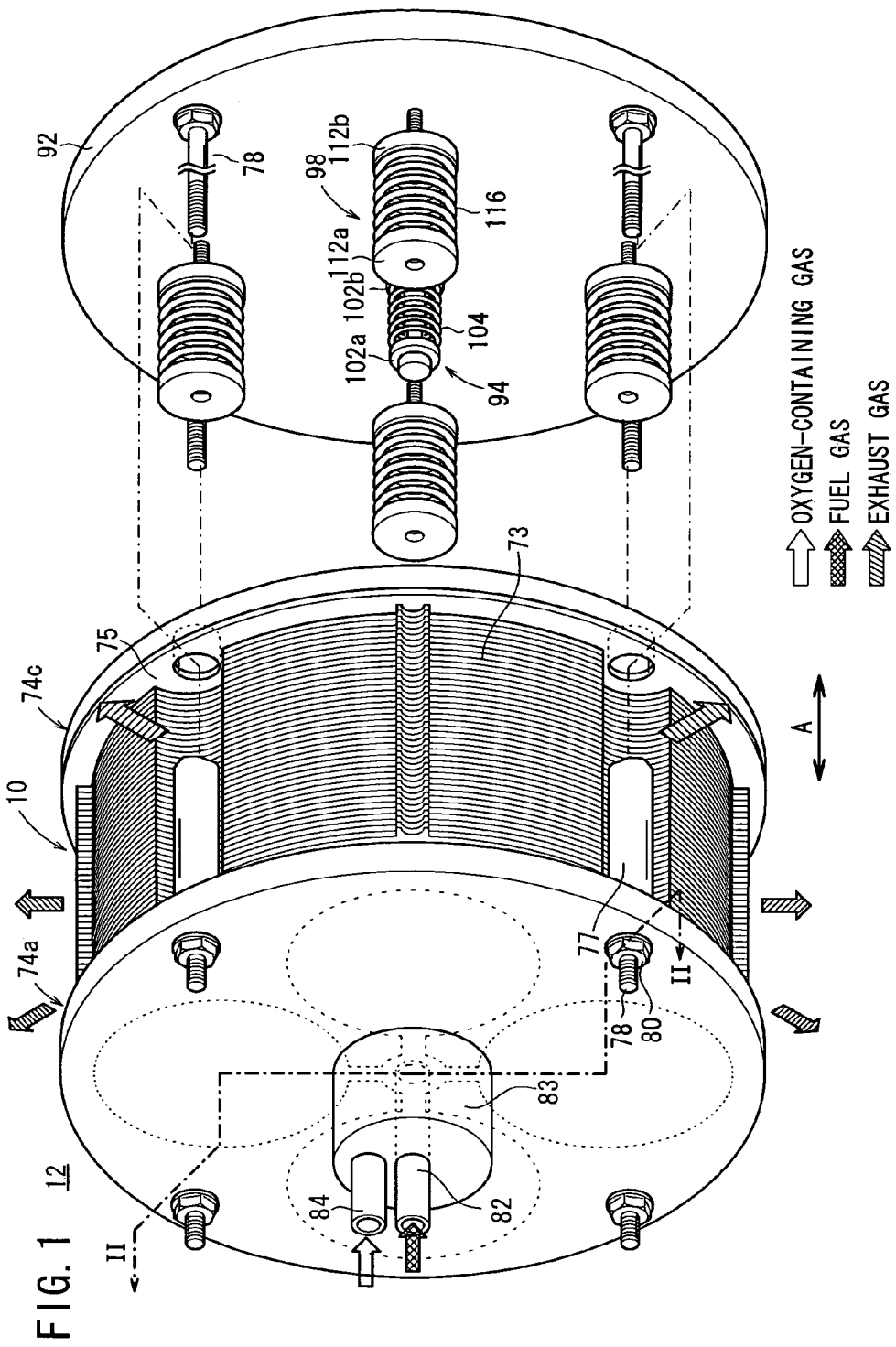
FIG. 1 is a perspective view schematically showing a fuel cell stack formed by stacking a plurality of fuel cells according to a first embodiment of the present invention.
Figure 2:
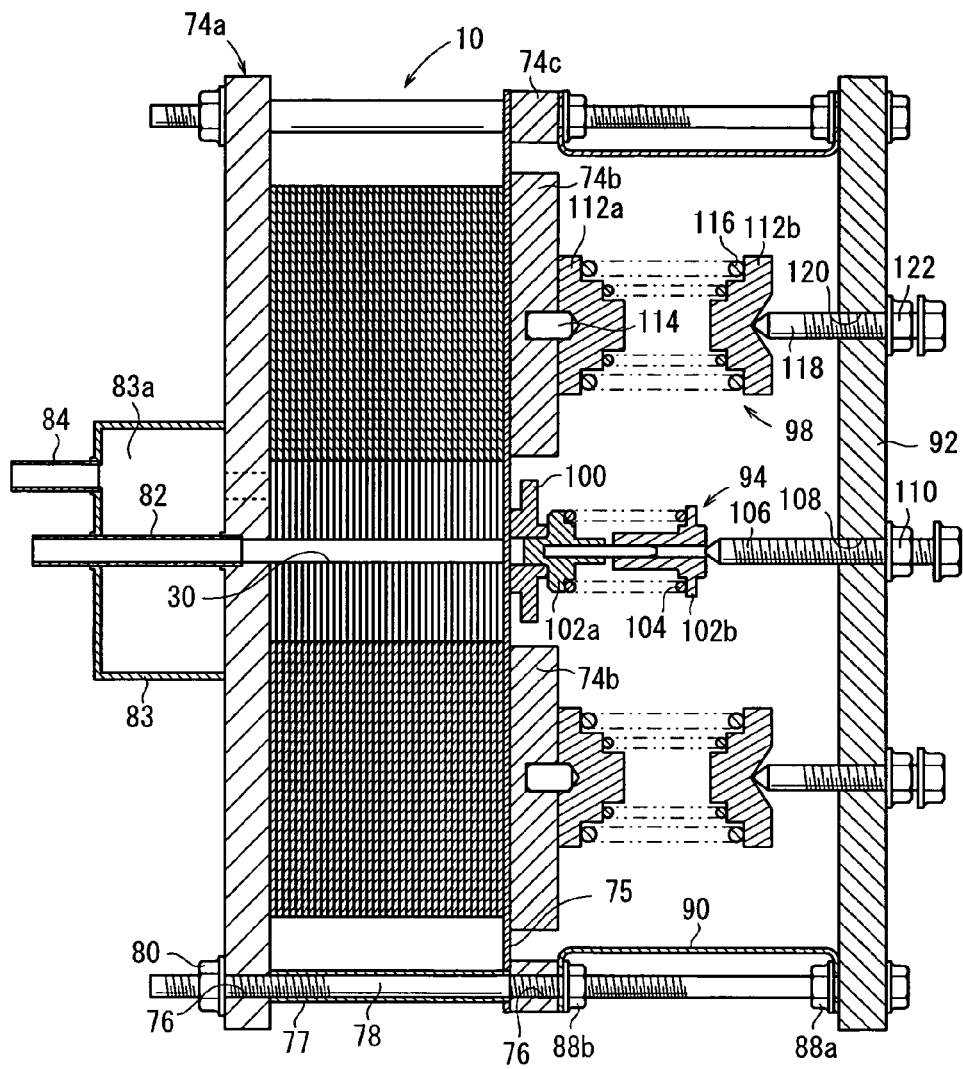
FIG. 2 is a cross sectional view showing the fuel cell stack, taken along line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along line II-II in FIG. 1.

Figure 3:
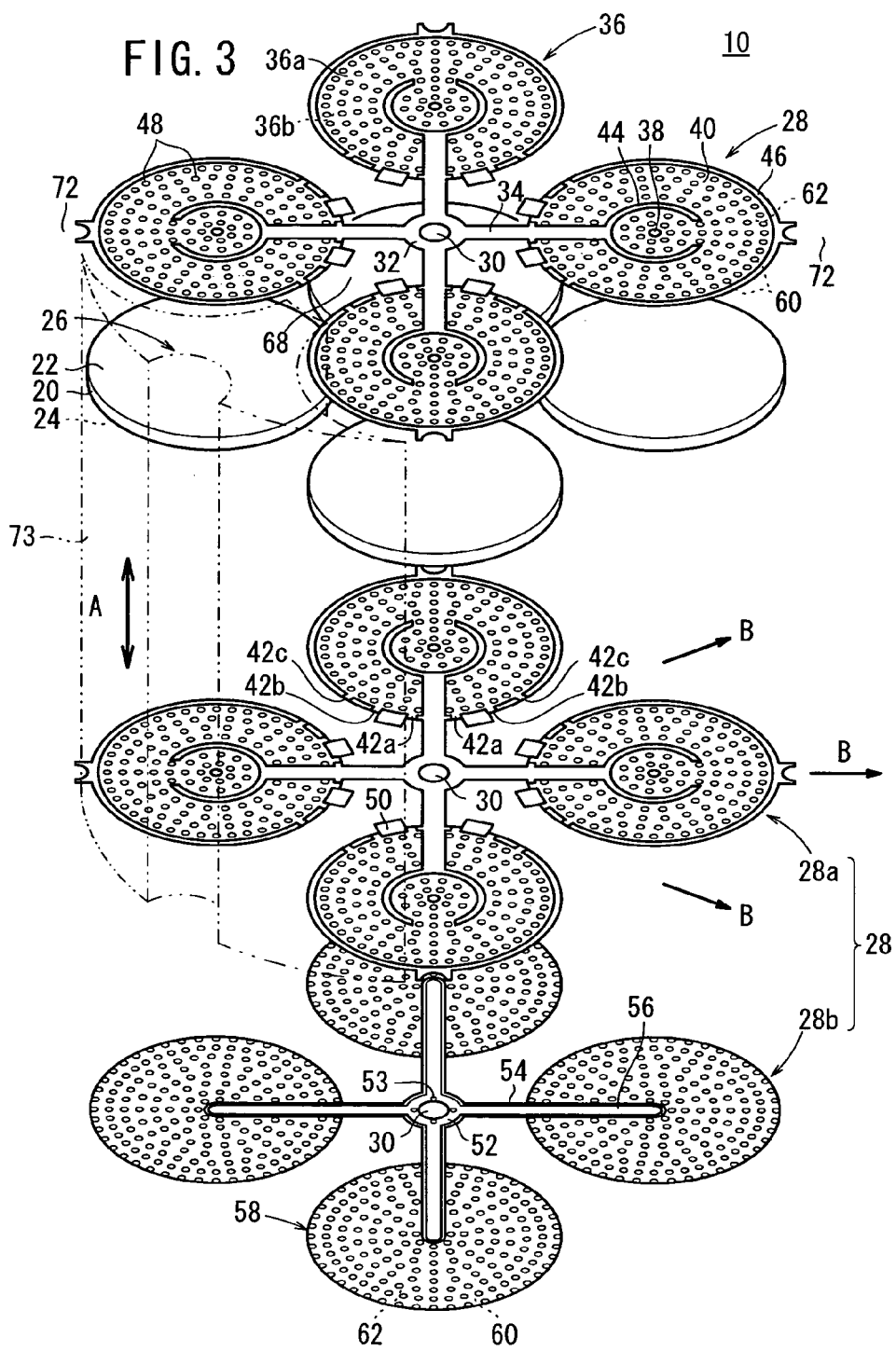
FIG. 3 is an exploded perspective view showing the fuel cell.
Figure 4:
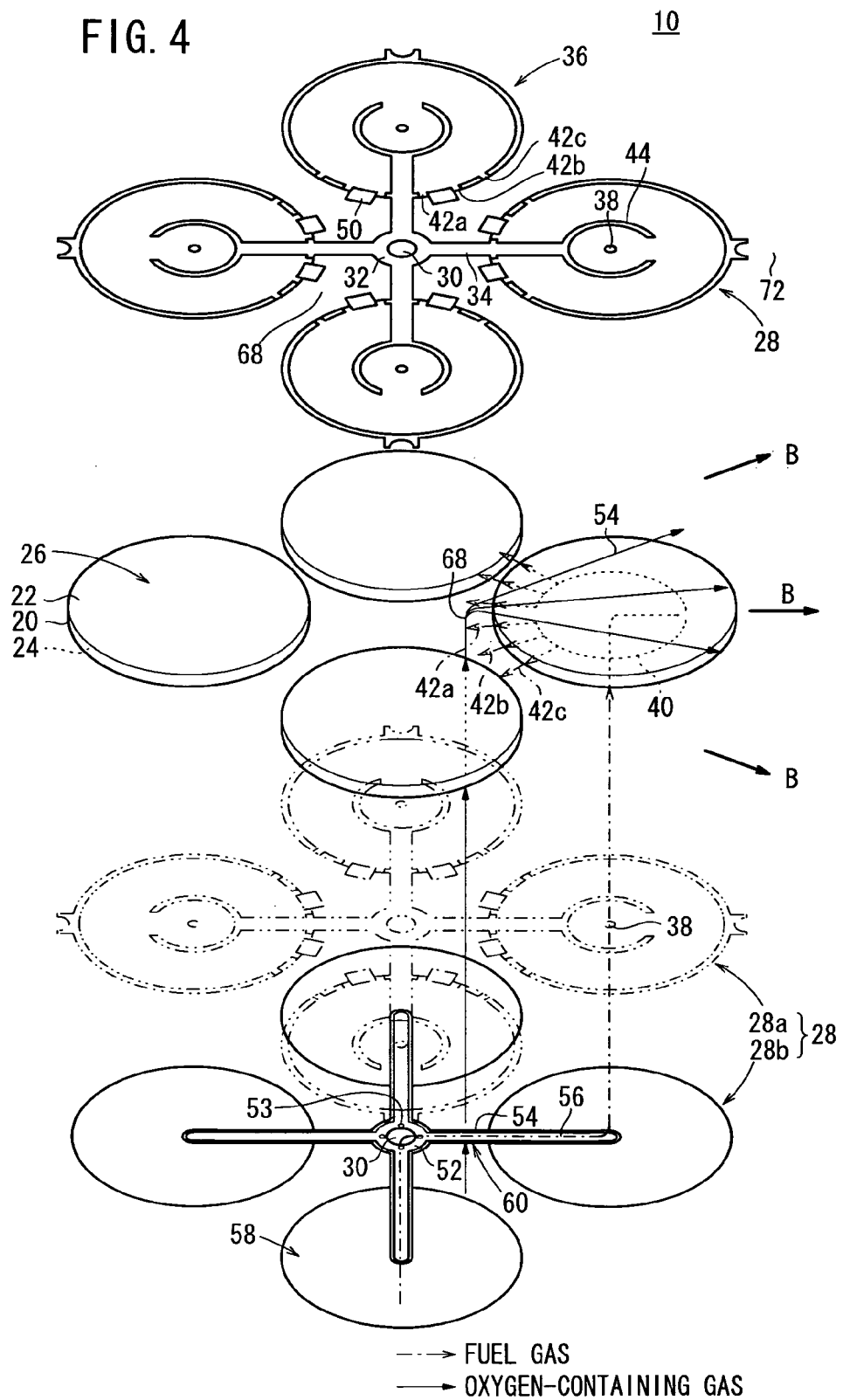
FIG. 4 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 3 and 4, the fuel cell 10 includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry or discharge of the oxygen-containing gas and the fuel gas.

The fuel cell 10 is formed by sandwiching a plurality of (e.g., four) electrolyte electrode assemblies 26 between a pair of separators 28. The four electrolyte electrode assemblies 26 are provided on a circle around a fuel gas supply passage 30 extending through the center of the separators 28.

As shown in FIG. 3, each of the separators 28 is formed by joining a first plate 28a and a second plate 28b made of, for example, a metal plate of stainless alloy, etc., or a carbon plate. The first plate 28a has, at the central part thereof, a first fuel gas supply section 32 through which the fuel gas supply passage 30 extends. Four first bridges 34 extend radially outwardly from the first fuel gas supply section 32 at equal angular intervals, e.g., 90°. The first fuel gas supply section 32 is integral with first sandwiching sections 36 each having a relatively large diameter through the first bridges 34. The centers of the first sandwiching sections 36 are equally distanced from the center of the first fuel gas supply section 32.

Each of the first sandwiching sections 36 has a circular disk shape, having substantially the same dimensions as the electrolyte electrode assembly 26. The first sandwiching sections 36 are separated from each other. A fuel gas inlet 38 for supplying the fuel gas is formed at the center of the first sandwiching section 36, or at a position deviated upstream from the center of the first sandwiching section 36 in the flow direction of the oxygen-containing gas.

Each of the first sandwiching sections 36 has a fuel gas channel 40 on a surface 36a which contacts the anode 24, for supplying a fuel gas along an electrode surface of the anode 24. Further, a pair of fuel gas outlets 42a, a pair of fuel gas outlets 42b, and a pair of fuel gas outlets 42c for discharging the fuel gas consumed in the fuel gas channel 40 and a circular arc wall (detour channel forming wall) 44 contacting the anode 24 and forming a detour path to prevent the fuel gas from flowing straight from the fuel gas inlet 38 to the fuel gas outlets 42a, 42b, 42c are provided on the surface 36a of the first sandwiching section 36.

The openings of the fuel gas outlets 42a, 42b, 42c have the same opening area. The fuel gas outlets 42a, 42b, 42c are provided on the side of a portion connecting the first sandwiching section 36 and the first bridge 34, on both sides of the first bridge 34 at equal intervals.

The circular arc wall 44 has a substantially horseshoe shape (circular arc shape with partial cutout). The fuel gas inlet 38 is provided inside the circular arc wall 44. On the surface 36a, an outer circumferential protrusion 46 and a plurality of projections 48 are provided. The outer circumferential protrusion 46 protrudes on the side of the fuel gas channel 40, and contacts the outer circumferential portion of the anode 24, and the projections 48 contact the anode 24.

The outer circumferential protrusion 46 has a substantially ring shape with partial cutouts at positions corresponding to the fuel gas outlets 42a, 42b, 42c. The projections 48 are made of, e.g., solid portions formed by etching or hollow portions formed by press forming.

The first sandwiching section 36 has a pair of extensions 50 for collecting electricity generated in the power generation of the electrolyte electrode assembly 26, and for measuring the state of the electrolyte electrode assembly 26. The extensions 50 protrude from the outer circumferential portion of the first sandwiching section 36 between the fuel gas outlets 42a, 42b.

Figure 5:
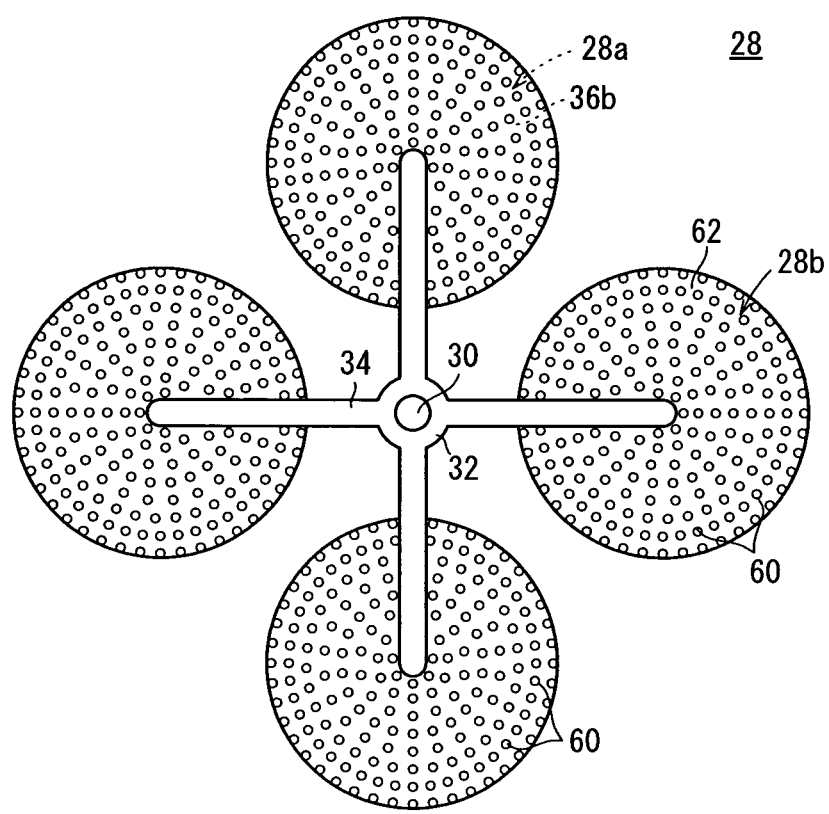
FIG. 5 is a plan view showing a separator of the fuel cell.
Figure 6:
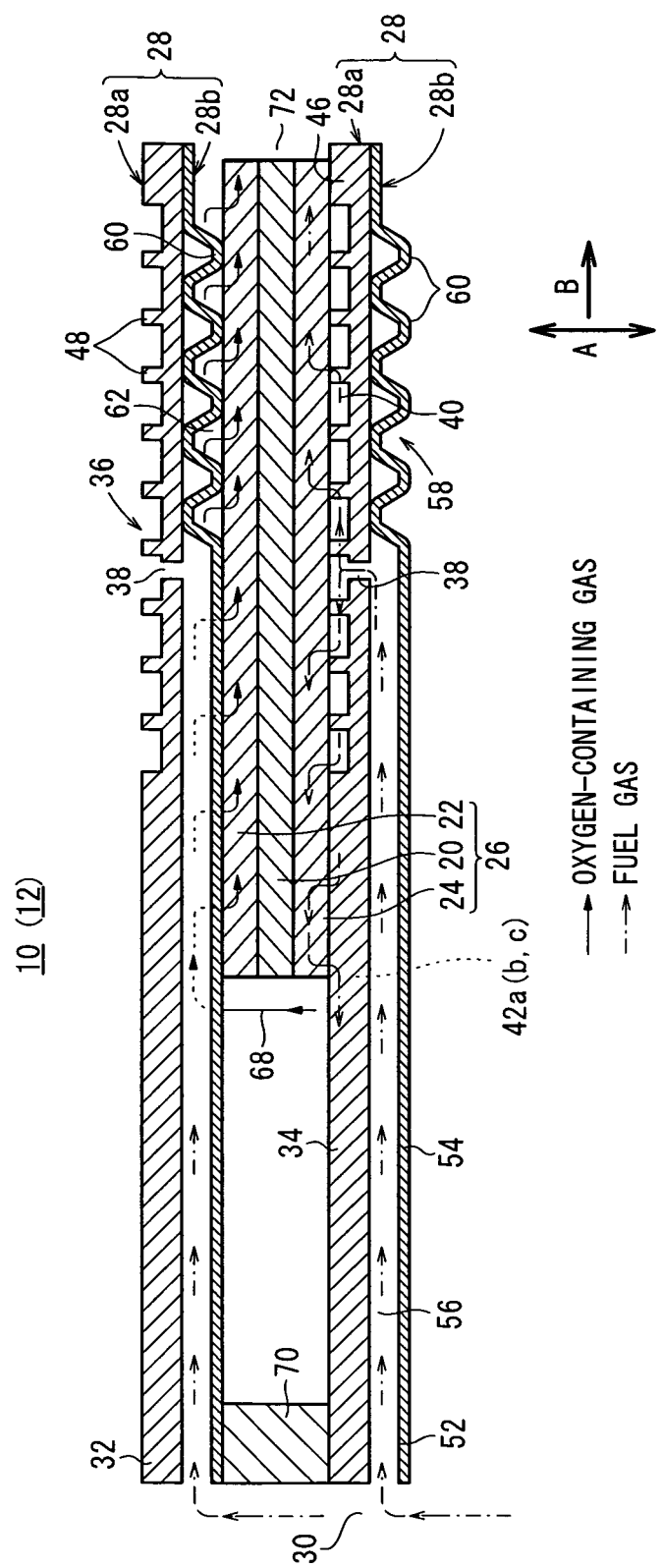
FIG. 6 is a cross sectional view explaining operation of the fuel cell.

As shown in FIGS. 5 and 6, each of the first sandwiching sections 36 has a substantially planar surface 36b which contacts the cathode 22. A second plate 28b is fixed to the surface 36b, e.g., by brazing, diffusion bonding, laser welding, or the like.

As shown in FIG. 3, a second fuel gas supply section 52 is formed at the center of the second plate 28b, and the fuel gas supply passage 30 extends through the fuel gas supply section 52. A predetermined number of reinforcement bosses 53 are formed on the fuel gas supply section 52. Four second bridges 54 extend radially from the fuel gas supply section 52. Each of the second bridges 54 has a fuel gas supply channel 56 connecting the fuel gas supply passage 30 to the fuel gas inlet 38. The fuel gas supply channel 56 is formed, for example, by etching or by press forming.

Each of the second bridges 54 is integral with a second sandwiching section 58 having a relatively large diameter. A plurality of projections 60 are provided on the second sandwiching section 58, e.g., by press forming. The projections 60 form an oxygen-containing gas channel 62 for supplying an oxygen-containing gas along an electrode surface of the cathode 22. The projections 60 function as a current collector (see FIGS. 3 and 6).

As shown in FIG. 6, the oxygen-containing gas supply passage 68 is connected to the oxygen-containing gas channel 62 for supplying the oxygen-containing gas from a space between an inner circumferential edge of the electrolyte electrode assembly 26 and an inner circumferential edge of the first and second sandwiching sections 36, 58 in a direction indicated by an arrow B. The oxygen-containing gas supply passage 68 extends at the center side of the separator around the first and second sandwiching sections 36, 58 in the stacking direction indicated by the arrow A, between the respective first and second bridges 34, 54 to form an oxygen-containing gas supply section.

An insulating seal 70 for sealing the fuel gas supply passage 30 is provided between the separators 28. For example, mica material, ceramic material or the like, i.e., crustal component material, glass material, or composite material of clay and plastic may be used for the insulating seal 70. The insulating seal 70 seals the fuel gas supply passage 30 from the electrolyte electrode assemblies 26.

In the fuel cell 10, an exhaust gas discharge passage 72 is provided at the outer circumferential side of the separator around the first and second sandwiching sections 36, 58. The exhaust gas discharge passage 72 forms an exhaust gas discharge section for discharging the fuel gas and the exhaust gas consumed in the electrolyte electrode assembly 26 as an exhaust gas in the stacking direction. As necessary, an air regulating plate 73 is provided in each space between the first and second sandwiching sections 36, 58.

As shown in FIGS. 1 and 2, the fuel cell stack 12 includes a first end plate 74a having a substantially circular disk shape at one end in the stacking direction of the fuel cells 10. Further, the fuel cell stack 12 includes a plurality of second end plates 74b and a fixing ring 74c at the other end in the stacking direction of the fuel cells 10, through a partition wall 75. Each of the second end plates 74b has a small diameter and a substantially circular shape, and the fixing ring 74c has a large diameter and a substantially ring shape. The partition wall 75 prevents diffusion of the exhaust gas to the outside of the fuel cells 10. The number of the second end plates 74b is four, corresponding to the positions of the stacked electrolyte electrode assemblies 26.

The first end plate 74a and the fixing ring 74c include a plurality of holes 76. Bolts 78 are inserted into the holes 76 and bolt insertion collar members 77, and screwed into nuts 80. By the bolts 78 and the nuts 80, the first end plate 74a and the fixing ring 74c are fixedly tightened together.

One fuel gas supply pipe 82, a casing 83, and one oxygen-containing gas supply pipe 84 are provided at the first end plate 74a. The fuel gas supply pipe 82 is connected to the fuel gas supply passage 30. The casing 83 has a cavity 83a connected to the respective oxygen-containing gas supply passages 68. The oxygen-containing gas supply pipe 84 is connected to the casing 83, and to the cavity 83a.

A support plate 92 is fixed to the first end plate 74a through a plurality of bolts 78, nuts 88a, 88b, and plate collar members 90. A first load applying unit 94 for applying a tightening load to the first and second fuel gas supply sections 32, 52, and second load applying units 98 for applying a tight load to each of the electrolyte electrode assemblies 26 are provided between the support plate 92 and the first end plate 74a. The first load applying unit 94 and the second load applying units 98 form a load applying mechanism.

The first load applying unit 94 includes a presser member 100 provided at the center of the fuel cells (centers of the first and second fuel gas supply sections 32, 52) for preventing leakage of the fuel gas from the fuel gas supply passage 30. The presser member 100 is provided near the center of the four second end plates 74b for pressing the fuel cells 10 through the partition wall 75. A first spring 104 is provided at the presser member 100 through a first receiver member 102a and a second receiver member 102b. A front end of a first presser bolt 106 contacts the second receiver member 102b. The first presser bolt 106 is screwed into a first screw hole 108 formed in the support plate 92. The depth position of the first presser bolt 106 is adjustable through a first nut 110.

Each of the second load applying units 98 includes a third receiver member 112a at the second end plate 74b, corresponding to each of the electrolyte electrode assemblies 26. The third receiver member 112a is positioned on the second end plate 74b through a pin 114. One end of a second spring 116 contacts the third receiver member 112a and the other end of the second spring 116 contacts a fourth receiver member 112b. A front end of the second presser bolt 118 contacts the fourth receiver member 112b. The second presser bolt 118 is screwed into a second screw hole 120 formed in the support plate 92. The depth position of the second presser bolt 118 is adjustable through the second nut 122.

Operation of the fuel cell stack 12 will be described below.

As shown in FIG. 1, the fuel gas is supplied through the fuel gas supply pipe 82 connected to the first end plate 74a. Then, the fuel gas flows into the fuel gas supply passage 30. The air as the oxygen-containing gas is supplied from the oxygen-containing gas supply pipe 84 to each of the oxygen-containing gas supply passages 68 through the cavity 83a.

As shown in FIG. 6, the fuel gas flows along the fuel gas supply passage 30 of the fuel cell stack 12 in the stacking direction indicated by the arrow A. The fuel gas moves through the fuel gas supply channel 56 of each fuel cell 10 along the surface of the separator 28.

The fuel gas flows from the fuel gas supply channel 56 into the fuel gas channel 40 through the fuel gas inlet 38 formed in the first sandwiching section 36. The fuel gas inlet 38 is provided at substantially the central position of the anode 24 of each electrolyte electrode assembly 26. Thus, the fuel gas is supplied from the fuel gas inlet 38 to substantially the center of the anode 24, and flows along the fuel gas channel 40 from substantially the central region to the outer circumferential region of the anode 24.

The air (oxygen-containing gas), which has been supplied to the oxygen-containing gas supply passages 68, flows from the space between the inner circumferential edge of the electrolyte electrode assembly 26 and the inner circumferential edges of the first and second sandwiching sections 36, 58 into the oxygen-containing gas channel 62 in the direction indicated by the arrow B. In the oxygen-containing gas channel 62, the air flows from the inner circumferential edge (center of the separator 28) of the cathode 22 to the outer circumferential edge (outer circumferential edge of the separator 28) of the cathode 22, i.e., from one end to the other end of the cathode 22 of the electrolyte electrode assembly 26.

Thus, in each of the electrolyte electrode assemblies 26, the fuel gas flows from the center to the outer circumferential side on the electrode surface of the anode 24, and the air flows in one direction indicated by the arrow B on the electrode surface of the cathode 22. At this time, oxide ions flow through the electrolyte 20 toward the anode 24 for generating electricity by electrochemical reactions.

The exhaust gas chiefly containing the air after consumption in the power generation reaction is discharged from the outer circumferential region of each of the electrolyte electrode assemblies 26, and flows through the exhaust gas discharge passage 72 as the off gas, and the off gas is discharged from the fuel cell stack 12 (see FIG. 1).

In the first embodiment, the outer circumferential protrusion 46 which contacts the outer circumferential portion of the anode 24 is provided on the surface 36a of the first sandwiching section 36. Therefore, the fuel gas supplied from the fuel gas inlet 38 to the fuel gas channel 40 is prevented from flowing to the outside without reaction. Therefore, the fuel gas can be utilized effectively by the power generation reaction, and the fuel utilization ratio is improved suitably.

Further, it is possible to prevent oxidation of the anode 24 due to entry of the exhaust gas or the oxygen-containing gas into the anode 24 from the outside of the electrolyte electrode assembly 26. Accordingly, it is possible to prevent the power generation efficiency from being lowered due to oxidation, and to improve durability of the separators 28 and the electrolyte electrode assemblies 26.

Further, in the surface 36a of the first sandwiching section 36, the fuel gas outlets 42a, 42b, 42c are provided on the side of a portion connecting the first sandwiching section 36 and the first bridge 34, on both sides of the first bridge 34. Therefore, the fuel gas is supplied from the fuel gas inlet 38 to the fuel gas channel 40 and is consumed in the reaction, after which the fuel gas is distributed into the fuel gas outlets 42a, 42b, 42c, and discharged separately.

Figure 7:
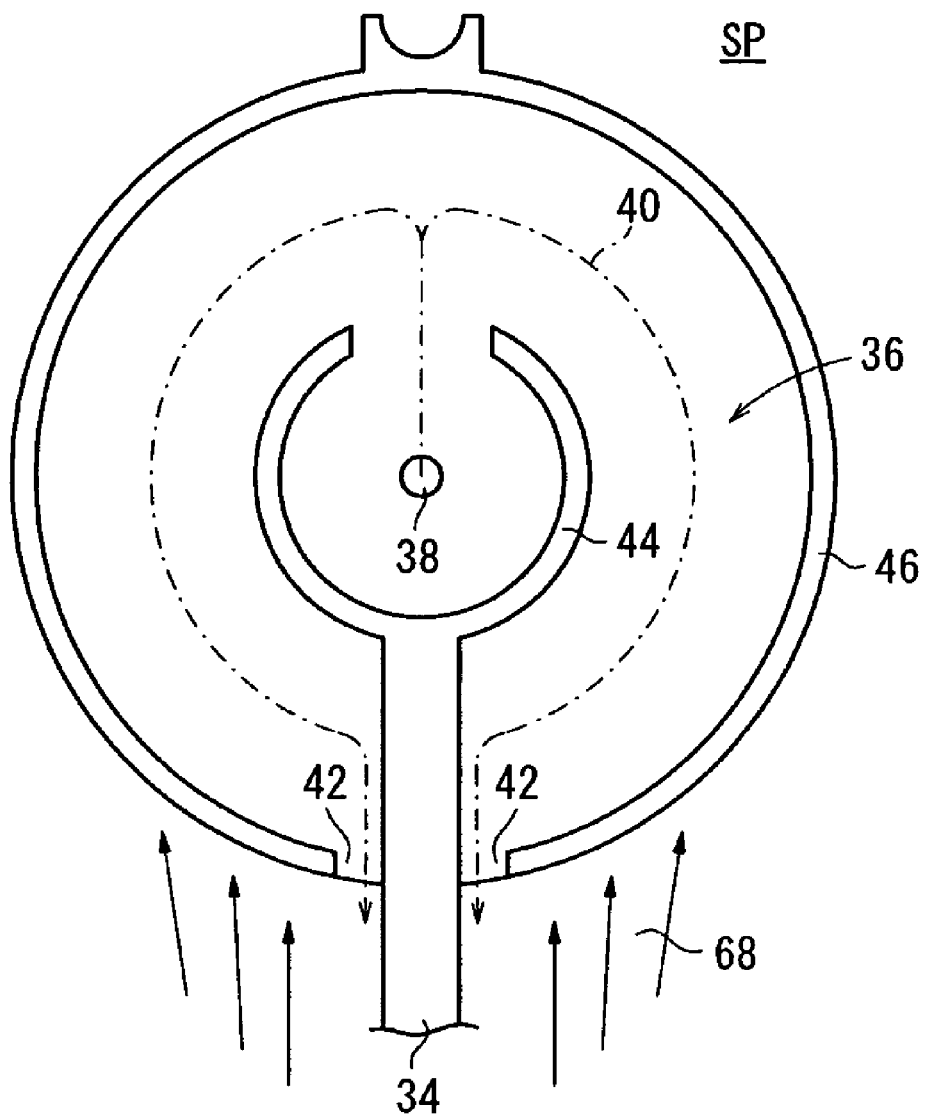
FIG. 7 is a partial view showing a separator of a comparative example.
Figure 8:
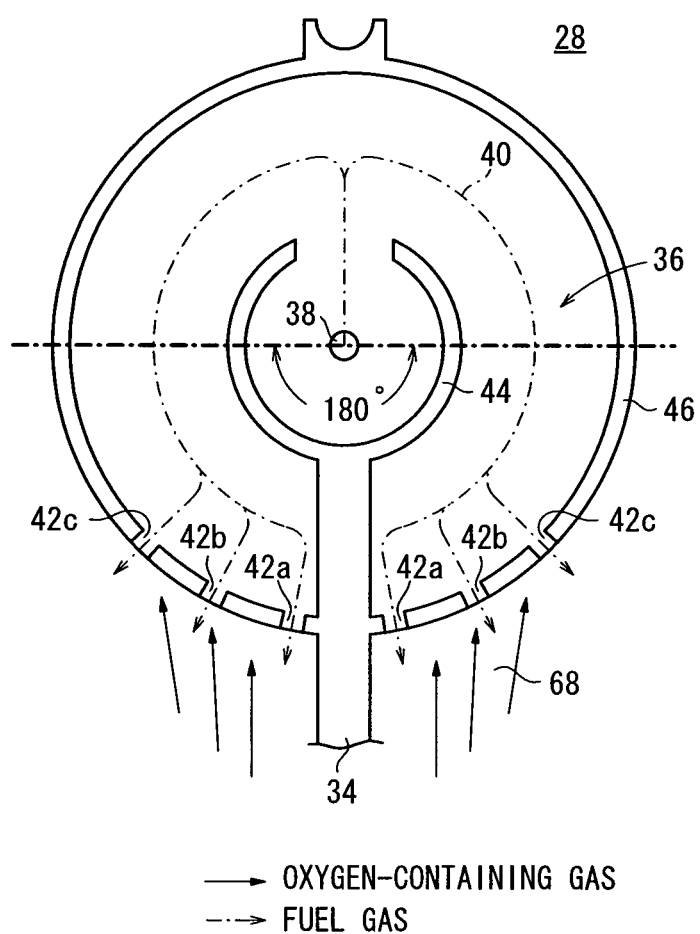
FIG. 8 is a partial view showing a separator used in a first embodiment.

An experiment was conducted using a separator SP (comparative example) shown in FIG. 7 and a separator 28 (first embodiment) shown in FIG. 8 to compare concentration distribution of the water vapor, the oxygen-containing gas, and the fuel gas. In the separator SP, two fuel gas outlets 42 are provided on the side of a portion connecting the first sandwiching section 36 and the first bridge 34. Each fuel gas outlet 42 is provided on each of both sides of the first bridge 34.

In the separator SP, the fuel gas supplied from the fuel gas inlet 38 to the fuel gas channel 40 is partially consumed at the anode 24, and then, the fuel gas is discharged from the two fuel gas outlets 42 to the oxygen-containing gas supply passage 68 as an exhaust fuel gas containing unconsumed fuel gas and water vapor.

Figure 9:
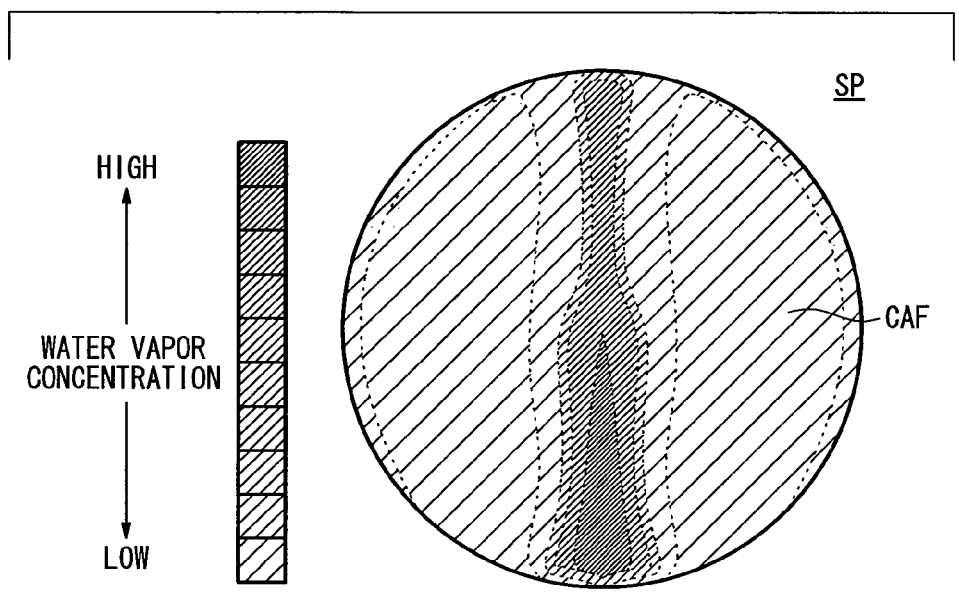
FIG. 9 is a view showing a water vapor concentration distribution in the cathode surface in the comparative example.
Figure 10:
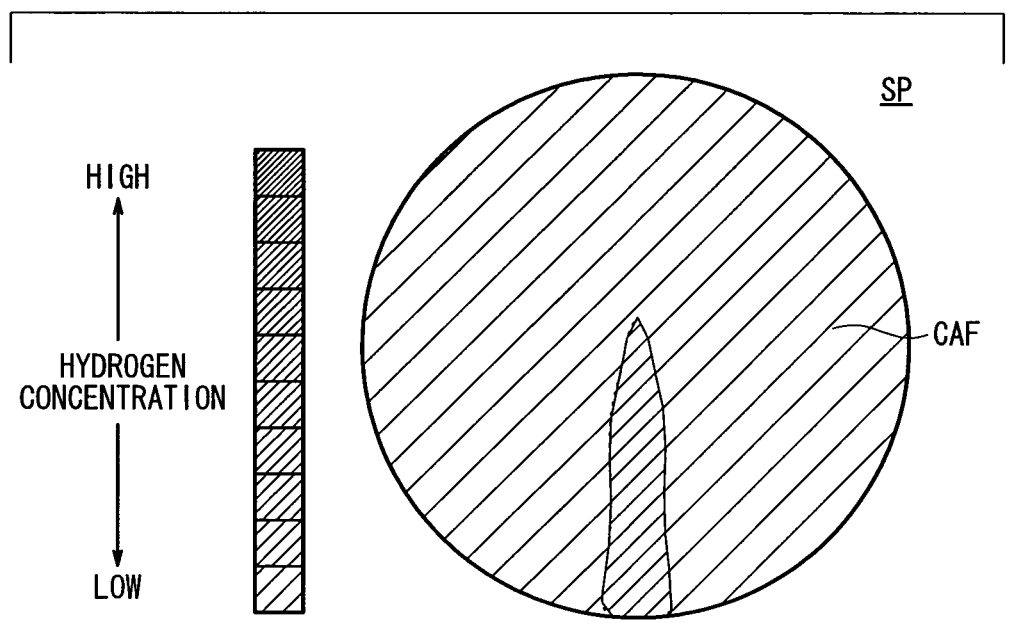
FIG. 10 is a view showing a fuel gas concentration distribution in the cathode surface in the comparative example.
Figure 11:
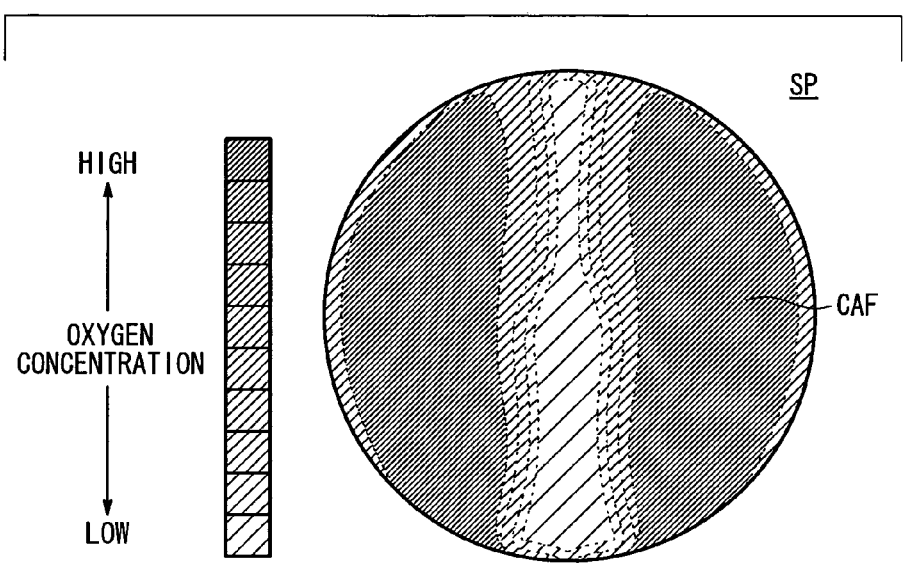
FIG. 11 is a view showing an oxygen-containing gas concentration distribution in the cathode surface in the comparative example.

At this time, as shown in FIG. 9, in the cathode surface CAF of the separator SP, the water vapor is concentrated at the central region of the cathode surface CAF. Further, as shown in FIG. 10, the unconsumed fuel gas (hydrogen) in the exhaust fuel gas is concentrated at the central region of the cathode surface CAF. Thus, as shown in FIG. 11, in the cathode surface CAF of the separator SP, shortage in the supply of the oxygen-containing gas (oxygen) easily occurs, particularly in the central region, and the power generation performance is lowered. Further, degradation of the cathode 22 occurs.

In contrast, in the separator 28 shown in FIG. 8, the fuel gas supplied from the fuel gas inlet 38 to the fuel gas channel 40 is partially consumed at the anode 24, and then, the fuel gas is distributed into the pair of the fuel gas outlets 42a, the pair of the fuel gas outlets 42b, and the pair of the fuel gas outlets 42c and discharged from the fuel gas outlets 42a, 42b, 42c to the oxygen-containing gas supply passage 68 separately, as the exhaust fuel gas containing water vapor and unconsumed fuel gas.

Therefore, in the cathode surface of the separator 28, the water vapor and the unconsumed fuel gas are not concentrated in a certain region (central region), and thus, degradation of the performance due to shortage in the supply of the oxygen-containing gas is prevented suitably. Accordingly, it becomes possible to achieve a uniform temperature distribution in the fuel cell 10, and the durability of the fuel cell 10 is improved advantageously.

Further, the fuel gas flowing through the fuel gas supply passage 30 and the fuel gas supply channel 56 is heated beforehand by the exhaust fuel gas. Therefore, it is possible to facilitate thermally self-sustained operation.

Further, in the first embodiment, as shown in FIG. 3, the circular arc wall 44 is provided in the path connecting the fuel gas inlet 38 and the fuel gas outlets 42a to 42c on the surface 36a of the first sandwiching section 36 of the separator 28. The circular arc wall 44 contacts the anode 24 of the electrolyte electrode assembly 26, and thus, improvement in the electricity collecting efficiency is obtained.

In the structure, the fuel gas supplied from the fuel gas inlet 38 to the fuel gas channel 40 is blocked by the circular arc wall 44. Thus, the fuel gas does not flow straight from the fuel gas inlet 38 to the fuel gas outlets 42a to 42c. The fuel gas flows around in the fuel gas channel 40, and the fuel gas flows along the anode 24 over a longer distance. That is, the fuel gas flows along the anode 24 over a longer period of time, and the fuel gas can be consumed effectively in the power generation reaction. Accordingly, the fuel gas utilization ratio is improved effectively.

Further, the first and second fuel gas supply sections 32, 52 are provided at the central part of the separator 28, and the plurality of, e.g., four electrolyte electrode assemblies 26 are arranged on a circle around the first and second fuel gas supply sections 32, 52. In the structure, the fuel gas and the oxygen-containing gas supplied to the fuel cells 10 (fuel cell stack 12) are suitably heated by heat generated by power generation and heat generated by reaction of the remaining fuel gas discharged from the fuel gas outlets 42a, 42b, 42c to the oxygen-containing gas supply passage 68 and the oxygen-containing gas flowing through the oxygen-containing gas supply passage 68. Thus, in the fuel cells 10 (fuel cell stack 12), it is possible to improve the heat efficiency and facilitate the thermally self-sustained operation.

Further, the fuel gas can be distributed uniformly to each of the electrolyte electrode assemblies 26 from the first and second fuel gas supply sections 32, 52. Thus, improvement and stability in the power generation performance are achieved in each of the electrolyte electrode assemblies 26.

Further, the first and second sandwiching sections 36, 58 have a shape corresponding to the electrolyte electrode assemblies 26, and the first and second sandwiching sections 36, 58 are separated from each other. Since the sandwiching sections 36, 58 have a shape, e.g., circular disk shape in correspondence with the electrolyte electrode assembly 26, it becomes possible to efficiently collect electrical energy generated in the electrolyte electrode assembly 26.

Further, since the first and second sandwiching sections 36, 58 are separated from each other, it becomes possible to absorb variation of the load applied to the respective electrolyte electrode assemblies 26 due to dimensional differences in the electrolyte electrode assemblies 26 and the separators 28. Thus, the undesired distortion does not occur in the entire separators 28. It is possible to apply the load equally to the electrolyte electrode assemblies 26. Further, thermal distortion or the like of the electrolyte electrode assemblies 26 is not transmitted to the adjacent, other electrolyte electrode assemblies 26, and no dedicated dimensional variation absorbing mechanisms are required between the electrolyte electrode assemblies 26. Thus, the electrolyte electrode assemblies 26 can be provided close to each other, and the overall size of the fuel cell 10 can be reduced easily.

Further, the first and second bridges 34, 54 extend radially outwardly from the first and second fuel gas supply sections 32, 52 such that the first and second bridges 34, 54 are spaced at equal angular intervals. In the structure, the fuel gas can be supplied from the fuel gas supply sections 32, 52 equally to the respective electrolyte electrode assemblies 26 through the first and second bridges 34, 54. Thus, improvement and stability in the power generation performance can be achieved in each of the electrolyte electrode assemblies 26.

Further, in the separator 28, preferably, the number of the first and second sandwiching sections 36, 58 and the number of the first and second bridges 34, 54 correspond to the number of the electrolyte electrode assemblies 26. Therefore, the fuel gas is uniformly supplied from the first and second fuel gas supply sections 32, 52 to each of the electrolyte electrode assemblies 26 through the first and second bridges 34, 54 and the first and second sandwiching sections 36, 58. Thus, improvement and stability in the power generation performance can be achieved in each of the electrolyte electrode assemblies 26.

Further, the projections 48 provided on the first sandwiching section 36 protrude on the side of the fuel gas channel 40, and contact the anode 24. Owing to the projections 48, electrical energy is generated efficiently.

Further, the projections 60 provided on the second sandwiching section 58 protrude on the side of the oxygen-containing gas channel 62, and contact the cathode 22. Through the projections 60, electrical energy is collected efficiently.

Further, the first sandwiching section 36 has one pair of extensions 50. In the structure, for example, electrical energy generated in the power generation of the electrolyte electrode assembly 26 can be collected, and a state such as the temperature of the electrolyte electrode assembly 26 can be measured easily, through the extensions 50.

Further, the extensions 50 are provided at the outer circumference of the first sandwiching section 36, between the fuel gas outlets 42a, 42b. In the structure, the extensions 50 are displaced from positions directly exposed to the exhaust fuel gas. Thus, overheating by the hot exhaust fuel gas is suppressed. The temperature measurement or the like of the separator 28 or the electrolyte electrode assembly 26 is performed highly precisely.

Further, since the fuel cell 10 has the exhaust gas discharge section where the exhaust gas discharge passage 72 extends in the stacking direction and the oxygen-containing gas supply section where the oxygen-containing gas supply passage 68 for supplying the oxygen-containing gas before supplied to the electrolyte electrode assembly 26, the overall size of the fuel cell 10 is reduced easily.

Moreover, the first and second fuel gas supply sections 32, 52 are provided at the center of the separator 28, and the plurality of, e.g., four oxygen-containing gas supply passages 68 are arranged on a circle around the first and second fuel gas supply sections 32, 52. Further, the oxygen-containing gas supply passages 68 are arranged between the plurality of, e.g., four first and second bridges 34, 54. In the structure, the fuel gas supplied to the fuel cells 10 (fuel cell stack 12) is suitably heated by heat generated by power generation. Thus, it is possible to improve the heat efficiency and facilitate the thermally self-sustained operation of the fuel cells 10 (fuel cell stack 12).

The fuel gas consumed in the electrolyte electrode assembly 26 is discharged through the fuel gas outlets 42a, 42b, and 42c to the oxygen-containing gas supply passage 68. In the structure, the oxygen-containing gas before consumption is heated by the reaction with the unconsumed fuel gas remaining in the exhaust fuel gas. Thus, it is possible to improve the heat efficiency.

Further, the fuel cell 10 is a solid oxide fuel cell. With a simple structure, the oxygen-containing gas and the exhaust gas can be prevented from flowing around to the anode 24. Further, the exhaust gas is distributed to achieve a uniform temperature distribution. Thus, it is possible to improve durability of the fuel cell (fuel cell stack) and facilitate the thermally self-sustained operation.

In the first embodiment, the three fuel gas outlets 42a, 42b, 42c are provided on the side of the portion connecting the first sandwiching section 36 and the first bridge 34, on each of both sides of the first bridge 34. However, the present invention is not limited in this respect. For example, two or more fuel gas outlets may be provided on each of both sides of the first bridge 34. Preferably, the area where the fuel gas outlets are formed is within a range of 180° of each of the first sandwiching sections 36 on the center side of the separator (see FIG. 8). At this time, preferably, the range of the fuel gas outlets is limited by the air regulating plate 73.

Further, the separator 28 is made of the first plate 28a and the second plate 28b. For example, the second plate 28b may be formed of two pieces, i.e., a circular plate and a cross-shaped plate.

Figure 12:
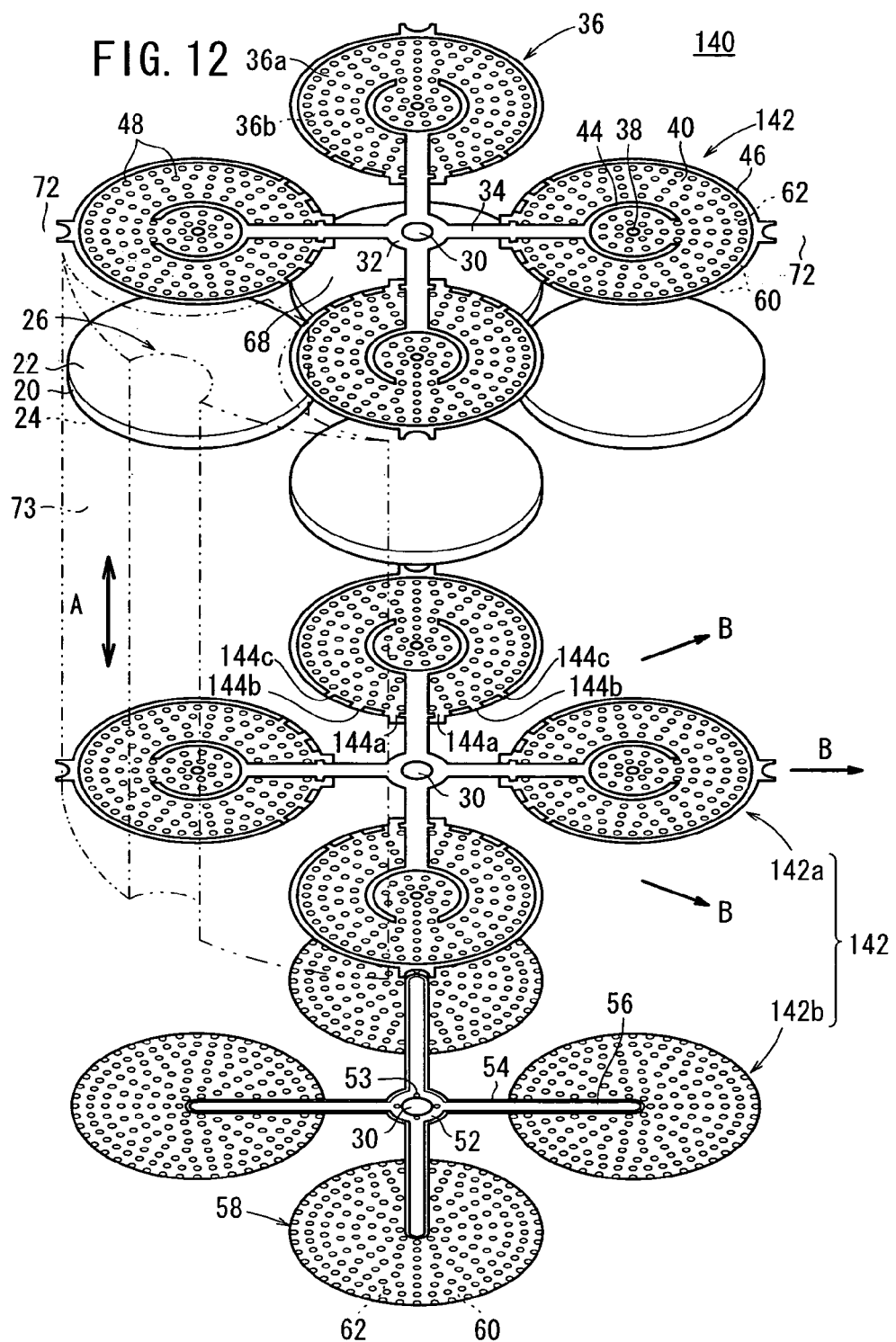
FIG. 12 is an exploded perspective view showing a fuel cell according to a second embodiment of the present invention.

FIG. 12 is an exploded perspective view showing a fuel cell 140 according to a second embodiment of the present invention. The constituent elements that are identical to those of the fuel cell 10 according to the first embodiment are labeled with the same reference numerals, and descriptions thereof will be omitted. Also in third to fifth embodiments as described later, the constituent elements that are identical to those of the fuel cell 10 according to the first embodiment are labeled with the same reference numerals, and descriptions thereof will be omitted.

A fuel cell 140 includes separators 142, and the separator 142 is formed by joining a first plate 142a and a second plate 142b. A pair of fuel gas outlets 144a, a pair of fuel gas outlets 144b, and a pair of fuel gas outlets 144c are provided on a surface 36a of each of first sandwiching sections 36 of the first plate 142a. A fuel gas consumed in the fuel gas channel 40 is discharged through the fuel gas outlets 144a, 144b, 144c.

The fuel gas outlets 144a are the closest to the first bridge 34. The fuel gas outlets 144c are the remotest from the first bridges 34. The fuel gas outlets 144a, 144b, 144c has the larger opening areas at positions closer to the first bridge 34.

In the second embodiment, the fuel gas outlets 144a, 144b, 144c have the larger opening areas at positions closer to the first bridge 34. In the structure, at a position remote from a portion connecting the first sandwiching section 36 and the first bridge 34, the fuel gas is prevented from flowing out without reaction, and the fuel gas flows along the electrode surface of the anode 24 over a longer period of the time. Thus, in addition to the same advantages as in the case of the first embodiment, the following advantages are obtained. That is, the fuel gas can be consumed effectively in the power generation reaction, and the fuel utilization ratio is improved suitably.

Figure 13:
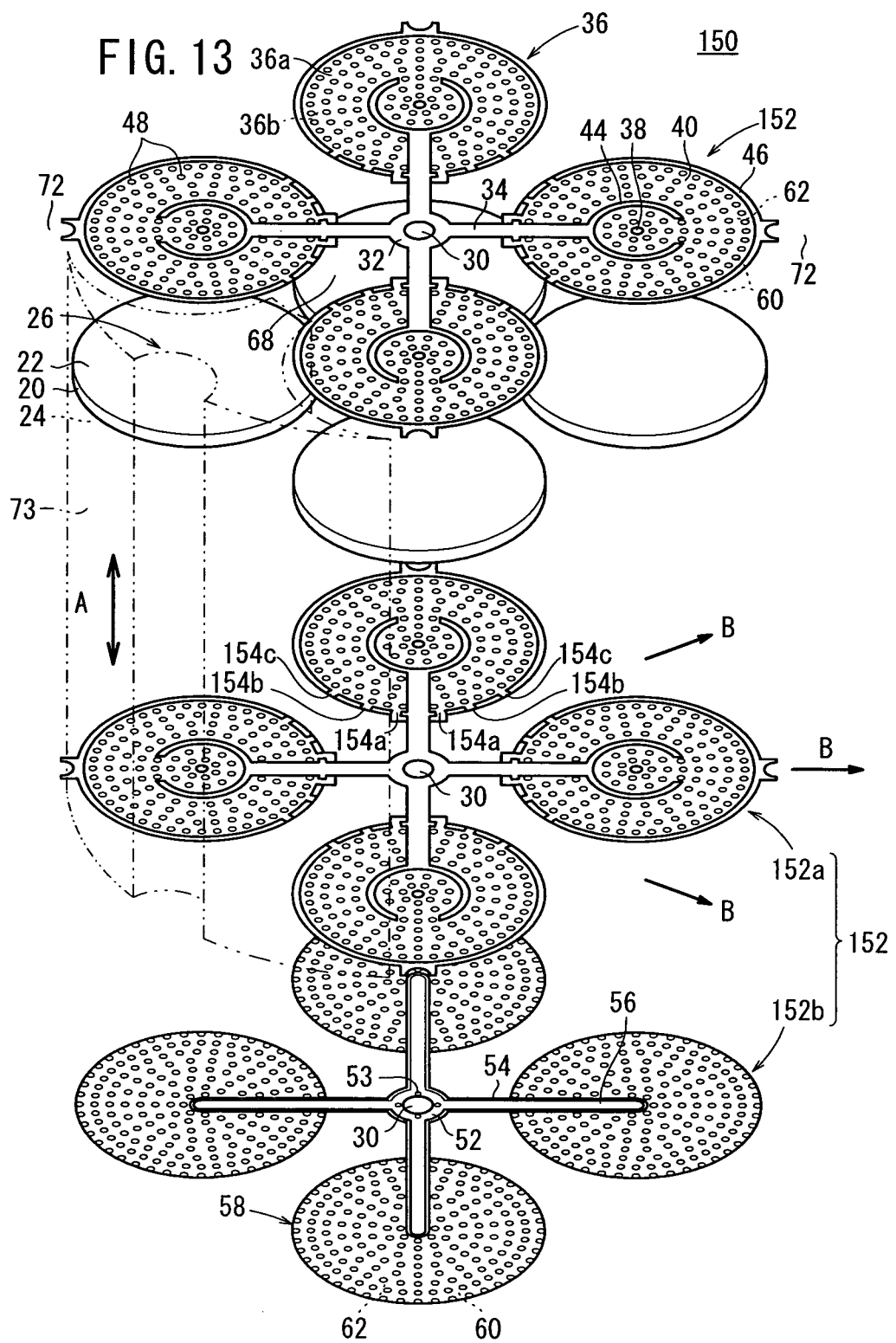
FIG. 13 is an exploded perspective view showing a fuel cell according to a third embodiment of the present invention.

FIG. 13 is an exploded perspective view showing a fuel cell 150 according to a third embodiment of the present invention.

The fuel cell 150 includes separators 152, and the separator 152 is formed by joining a first plate 152a and a second plate 152b. A pair of fuel gas outlets 154a, a pair of fuel gas outlets 154b, and a pair of fuel gas outlets 154c are provided on a surface 36a of each of first sandwiching sections 36 of the first plate 152a. A fuel gas consumed in the fuel gas channel 40 is discharged through the fuel gas outlets 154a, 154b, 154c.

The fuel gas outlets 154a, 154b, and 154c have the same opening area. The fuel gas outlets 154a, 154b, and 154c are provided on the side of a portion connecting the first sandwiching section 36 and the first bridge 34, on both sides of the first bridge 34. The fuel gas outlets 154a, 154b, and 154c are provided remotely from each other. The interval between the fuel gas outlets 154a, 154b is smaller than the interval between the fuel gas outlets 154b, 154c.

In the third embodiment, the interval between the fuel gas outlets 154a, 154b, 154c get smaller at positions closer to the portion connecting the first sandwiching section 36 and the first bridge 34. Therefore, the same advantages as in the cases of the first and second embodiments are obtained. For example, at positions remote from the connecting portion, the fuel gas is prevented from flowing out without reaction, and the fuel gas is consumed effectively in the power generation reaction. Improvement in the fuel utilization ratio is achieved.

Figure 14:
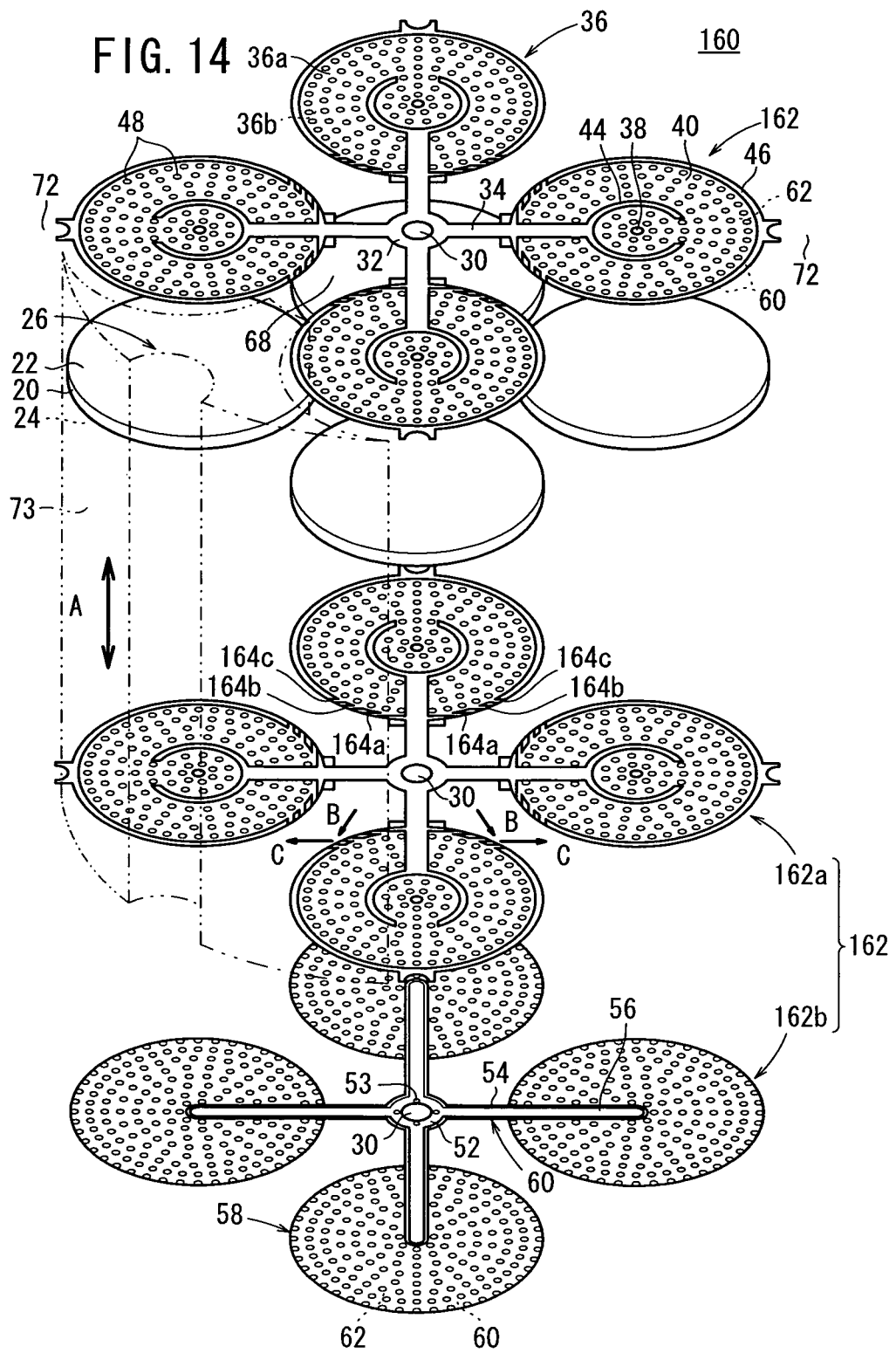
FIG. 14 is an exploded perspective view showing a fuel cell according to a fourth embodiment of the present invention.

FIG. 14 is an exploded perspective view showing a fuel cell 160 according to a fourth embodiment of the present invention.

The fuel cell 160 includes separators 162, and the separator 162 is formed by joining a first plate 162a and a second plate 162b. A pair of fuel gas outlets 164a, a pair of fuel gas outlets 164b, and a pair of fuel gas outlets 164c are provided on a surface 36a of each of first sandwiching sections 36 of the first plate 162a. A fuel gas consumed in the fuel gas channel 40 is discharged through the fuel gas outlets 164a, 164b, 164c.

The fuel gas outlets 164a, 164b, and 164c have the same opening area. The fuel gas outlets 164a, 164b, and 164c are provided on the side of a portion connecting the first sandwiching section 36 and the first bridge 34, on both sides of the first bridge 34 at equal intervals. The gas flow directions (indicated by the arrow C) at the fuel gas outlets 164a, 164b, 164c intersect straight lines connecting the first fuel gas supply section 32 and the fuel gas outlets 164a, 164b, 164c.

In the fourth embodiment, when the oxygen-containing gas flows in the direction indicated by the arrow B, the flow directions at the fuel gas outlets 164a, 164b, 164c intersect the flow directions of the oxygen-containing gas. In the structure, it is possible to prevent the other gases such as the oxygen-containing gas and the exhaust gas from flowing around to the anode 24 from the outside of the electrolyte electrode assembly 26. Thus, degradation of the power generation efficiency due to oxidation of the anode 24 is prevented, and improvement in the durability of the separator 162 and the electrolyte electrode assembly 26 is achieved.

Further, owing to the negative pressure effect by the flow of the oxygen-containing gas, the exhaust fuel gas is discharged smoothly from the fuel gas outlets 164a, 164b, 164c. In the structure, operation of the fuel cell 160 is carried out efficiently.

Figure 15:
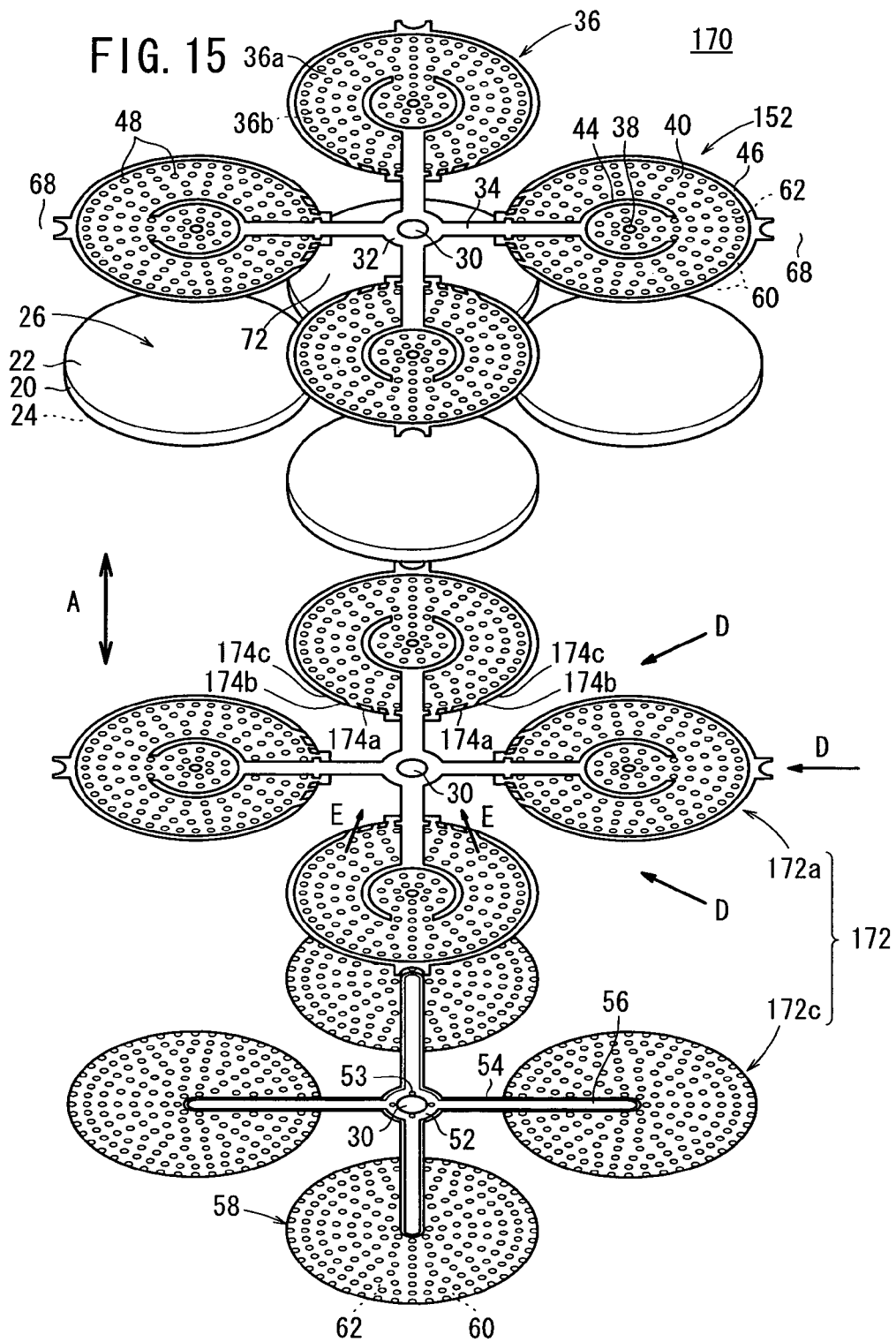
FIG. 15 is an exploded perspective view showing a fuel cell according to a fifth embodiment of the present invention.
Figure 16:
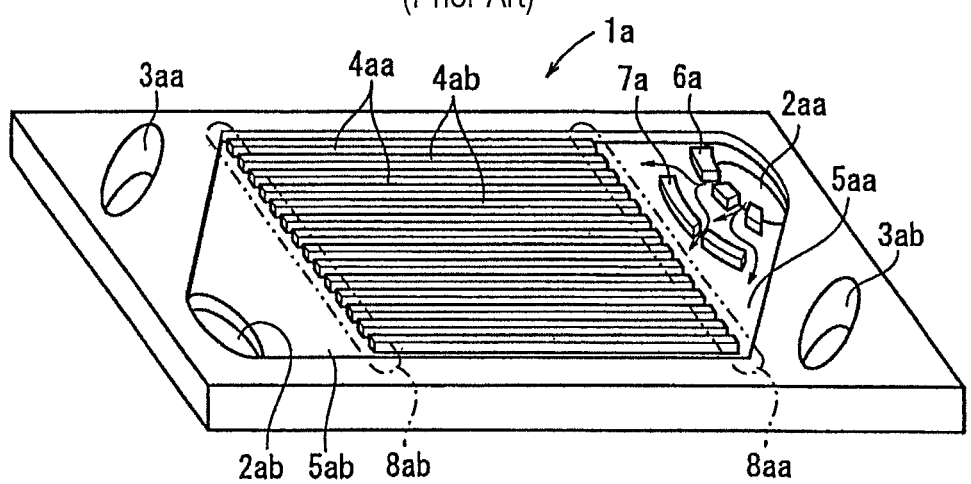
FIG. 16 is a view showing a separator of a fuel cell disclosed in Japanese Laid-Open Patent Publication No. 10-172594.
Figure 17:
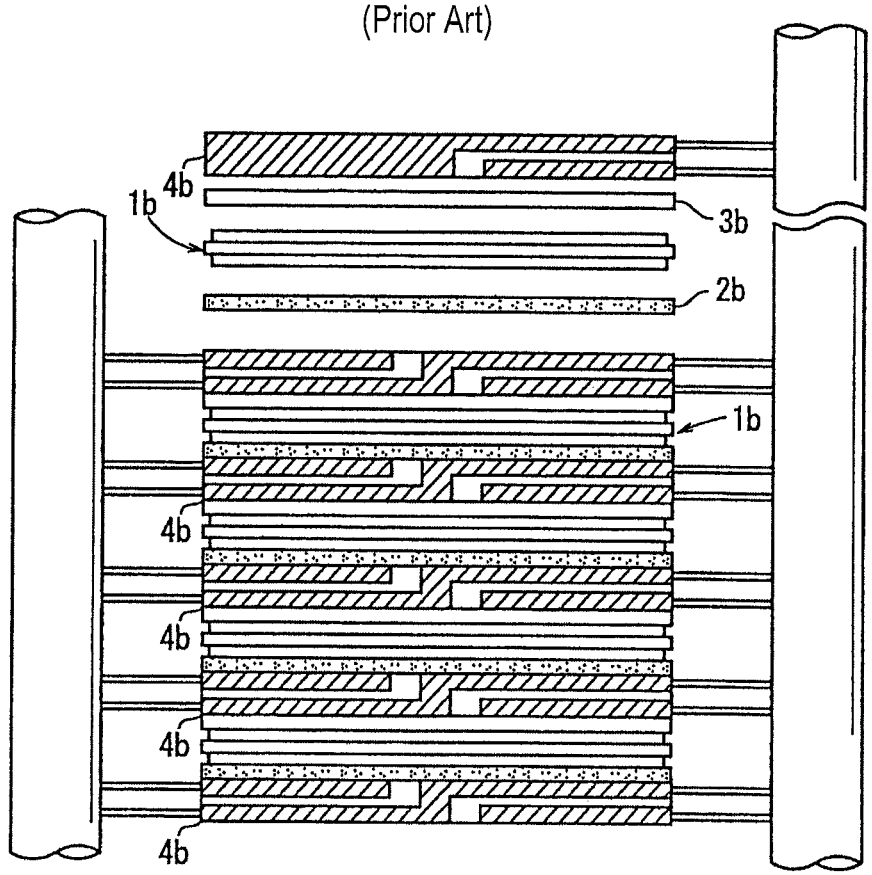
FIG. 17 is a partial cross sectional view showing a fuel cell disclosed in Japanese Laid-Open Patent Publication No. 2005-085520.
Figure 18:
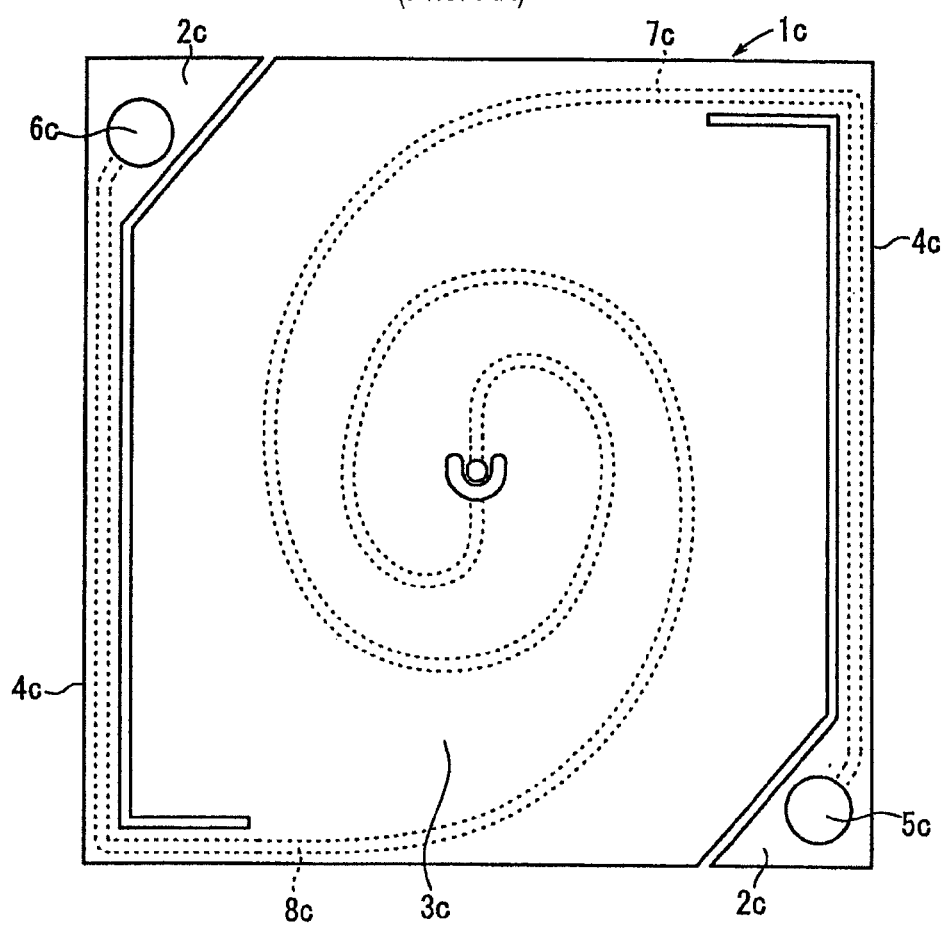
FIG. 18 is a view showing a separator of a fuel cell disclosed in Japanese Laid-Open Patent Publication No. 2006-120589.

FIG. 15 is an exploded perspective view showing a fuel cell 170 according to a fifth embodiment of the present invention.

In the fuel cell 170, oxygen-containing gas supply passages 68 are positioned on the outer circumferential side of the separator around the first and second sandwiching sections 36, 58. A plurality of exhaust gas discharge passages 72 are arranged on a circle around the first and second fuel gas supply sections 32, 52. Each of the exhaust gas discharge passages 72 is provided between the first and second bridges 34, 54. That is, the oxygen-containing gas is supplied in the directions indicated by the arrow D (in the direction opposite to the direction indicated by the arrow B) from the outside of the first and second sandwiching sections 36, 58, and the oxygen-containing gas is discharged to the exhaust gas discharge passages 72 on the center side of the separator around the first and second sandwiching sections 36, 58.

The fuel cell 170 includes separators 172, and the separator 172 is formed by joining a first plate 172a and a second plate 172b. A pair of fuel gas outlets 174a, a pair of fuel gas outlets 174b, and a pair of fuel gas outlets 174c are provided on a surface 36a of each of first sandwiching sections 36 of the first plate 172a. The fuel gas consumed in the fuel gas channel 40 is discharged through the fuel gas outlets 174a, 174b, 174c. The fuel gas outlets 174a, 174b, 174c have the same opening area. The fuel gas outlets 174a, 174b, and 174c are provided on the side of a portion connecting the first sandwiching section 36 and the first bridge 34, on both sides of the first bridge 34 at equal intervals.

The gas flow directions indicated by arrows E at the fuel gas outlets 174a, 174b, 174c are the same directions as straight lines connecting the first fuel gas supply section 32 and the fuel gas outlets 174a, 174b, 174c.

In the fifth embodiment, the oxygen-containing gas flows along the cathode 22 from the outside of the first and second sandwiching sections 36, 58 toward the first and second fuel gas supply sections 32, 52. In the structure, it is possible to prevent the other gases such as oxygen-containing gas and exhaust gas from flowing around to the anode 24 from the outside of the electrolyte electrode assembly 26. Thus, degradation of the power generation efficiency due to oxidation of the anode 24 is prevented, and improvement in the durability of the separator 172 and the electrolyte electrode assembly 26 is achieved.

Further, the oxygen-containing gas flows in the direction indicated by the arrows D, and the gas flow directions at the fuel gas outlets 174a, 174b, 174c are the directions indicated by the arrows E. In the structure, the directions indicated by the arrows D and the direction indicated by the arrow E are the same. Thus, the same advantages as in the cases of the first to fourth embodiments are obtained. For example, owing to the negative pressure effect by the flow of the oxygen-containing gas, the exhaust fuel gas is discharged smoothly through the fuel gas outlets 174a, 174b, 174c.

Further, in the fifth embodiment, the exhaust gas discharge passages 72 are arranged on a circle around the first and second fuel gas supply sections 32, 52. Further, the exhaust gas discharge passage 72 is arranged between the first and second bridges 34, 54. In the structure, the fuel gas supplied to the fuel cell 170 (and the fuel cell stack) is suitably heated by heat generated in the power generation and the exhaust gas. Thus, it is possible to improve the heat efficiency and facilitate the thermally self-sustained operation.

The fuel gas supplied to and consumed in the electrolyte electrode assembly 26 is discharged through the fuel gas outlets 174a, 174b, 174c to the exhaust gas discharge passage 72. In the structure, by reaction of the unconsumed fuel gas remaining in the exhaust fuel gas and the unconsumed oxygen-containing gas, the exhaust gas can be further heated, and improvement in the thermal efficiency is achieved.

Further, the oxygen-containing gas supplied to and consumed in the electrolyte electrode assembly 26 is discharged into the exhaust gas discharge passage 72 through the oxygen-containing gas channel 62. Thus, by reaction of the unconsumed fuel gas remaining in the exhaust fuel gas and the unconsumed oxygen-containing gas, the exhaust gas can be further heated, and improvement in the thermal efficiency is achieved.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell formed by stacking electrolyte electrode assemblies and separators alternately in a stacking direction, the electrolyte electrode assemblies each including an anode, a cathode, and an electrolyte interposed between the anode and the cathode, the separators each including:
  a sandwiching section for sandwiching at least one of the electrolyte electrode assemblies, a fuel gas channel for supplying a fuel gas along an electrode surface of the anode of one of the electrolyte electrode assemblies and an oxygen-containing gas channel for supplying an oxygen-containing gas along an electrode surface of the cathode of another one of the electrolyte electrode assemblies;
  a bridge connected to the sandwiching section, a fuel gas supply channel for supplying the fuel gas to the fuel gas channel being formed in the bridge, a plurality of protrusions being provided on the bridge at a circumferential edge of the separator; and
  a fuel gas supply section connected to the bridge, a fuel gas supply passage for supplying the fuel gas to the fuel gas supply channel extending through the fuel gas supply section in the stacking direction,
the sandwiching section including:
  a fuel gas inlet for supplying the fuel gas to the fuel gas channel,
  an outer circumferential protrusion protruding on the side of the fuel gas channel, and contacting an outer circumference of the anode, and
a plurality of fuel gas outlets provided on the side of a portion connecting the sandwiching section and the bridge, wherein:
  each of the plurality of fuel gas outlets is angled away from the bridge such that the outlets are non-parallel with the bridge,
  the plurality of fuel gas outlets include a first plurality of fuel gas outlets on a first side of the bridge and a second plurality of fuel gas outlets on a second side of the bridge,
  the first plurality of fuel gas outlets are provided on a circumference of the sandwiching section on a first side of the bridge within a range of about 90° of a center point at which the bridge contacts the sandwiching section,
  the second plurality of fuel gas outlets are provided on the circumference of the sandwiching section on a second side of the bridge within a range of about 90° of the center point,
  the plurality of fuel gas outlets discharge the fuel gas consumed in the fuel gas channel,
  the plurality of fuel gas outlets are disposed symmetrically on both sides of the bridge such that an equal number of fuel gas outlets are disposed on each side, the bridge is free of a fuel gas outlet, and at least a portion of the plurality of fuel gas outlets is formed by the plurality of protrusions provided on the bridge, and
  the plurality of fuel gas outlets have larger opening areas at positions closer to the portion connecting the sandwiching section and the bridge.

2. A fuel cell according to claim 1, wherein the sandwiching section further includes a detour channel forming wall protruding on the side of the fuel gas channel to contact the anode, the detour channel forming wall preventing the fuel gas from flowing straight from the fuel gas inlet to the fuel gas outlets.

3. A fuel cell according to claim 1, wherein intervals between the adjacent fuel gas outlets get smaller at positions closer to the portion connecting the sandwiching section and the bridge.

4. A fuel cell according to claim 1, wherein gas flow directions at the fuel gas outlets intersect directions of straight lines connecting the fuel gas supply section and the fuel gas outlets.

5. A fuel cell according to claim 1, wherein gas flow directions at the fuel gas outlets are the same directions as straight lines connecting the fuel gas supply section and the fuel gas outlets.

6. A fuel cell according to claim 1, wherein the fuel gas supply section is provided at the center of the separator, and a plurality of the electrolyte electrode assemblies are arranged on a circle around the fuel gas supply section.

7. A fuel cell according to claim 1, wherein the sandwiching section has a shape corresponding to each of the electrolyte electrode assemblies, and a plurality of the sandwiching sections are separated from each other.

8. A fuel cell according to claim 1, wherein a plurality of the bridges extend radially outwardly from the fuel gas supply section at equal angular intervals.

9. A fuel cell according to claim 1, wherein, in the separator, the numbers of the sandwiching sections and the bridges correspond to the number of the electrolyte electrode assemblies.

10. A fuel cell according to claim 1, wherein a plurality of projections protruding on the side of the fuel gas channel to contact the anode are provided on each of the sandwiching sections.

11. A fuel cell according to claim 1, wherein a plurality of projections protruding on the side of the oxygen-containing gas channel to contact the cathode are provided on each of the sandwiching sections.

12. A fuel cell according to claim 1, wherein an extension for collecting electrical energy generated in the electrolyte electrode assembly or measuring a state of the electrolyte electrode assembly is provided on at least one of the sandwiching sections.

13. A fuel cell according to claim 12, wherein the extension is provided on an outer circumference of the sandwiching section, between the fuel gas outlets.

14. A fuel cell according to claim 1, further including:
an exhaust gas discharge section made up of an exhaust gas discharge passage extending in the stacking direction for discharging, as an exhaust gas, the fuel gas and the oxygen-containing gas supplied to the electrolyte electrode assemblies and consumed by reaction in the electrolyte electrode assemblies; and
an oxygen-containing gas supply section made up of an oxygen-containing gas supply passage extending in the stacking direction for supplying the oxygen-containing gas to the oxygen-containing gas channel before the oxygen-containing gas is supplied to the electrolyte electrode assemblies.

15. A fuel cell according to claim 14, wherein the fuel gas supply section is provided at the center of the separator, and a plurality of the oxygen-containing gas supply passages are arranged on a circle around the fuel gas supply section, and the oxygen-containing gas supply passages are arranged between the bridges.

16. A fuel cell according to claim 15, wherein the fuel gas supplied to the electrolyte electrode assemblies and consumed by reaction in the electrolyte electrode assemblies, is discharged as an exhaust fuel gas through the fuel gas outlets to the oxygen-containing gas supply passages.

17. A fuel cell according to claim 14, wherein the fuel gas supply section is provided at the center of the separator, a plurality of the exhaust gas discharge passages are arranged on a circle around the fuel gas supply section, and the exhaust gas discharge passages are arranged between the bridges.

18. A fuel cell according to claim 17, wherein the fuel gas supplied to and consumed in the electrolyte electrode assemblies is discharged as an exhaust fuel gas through the fuel gas outlets to the exhaust gas discharge passages.

19. A fuel cell according to claim 14, wherein the oxygen-containing gas supplied to and consumed in the electrolyte electrode assemblies is discharged as an exhaust oxygen-containing gas through the oxygen-containing gas channel to the exhaust gas discharge passage.

20. A fuel cell according to claim 1, wherein the fuel cell is a solid oxide fuel cell.

* * * * *